United States Patent
Cabrini (10) Patent No.: US 8,682,614 B2
(45) Date of Patent: Mar. 25, 2014

(54) DEMAND WEIGHTED AVERAGE POWER (75) Inventor: Al Cabrini, New York, NY (US)

(73) Assignee: GridNavigator, Inc., Redmond, WA (US)

(*) Notice: Subject to any disclaimer, the term of this patent is extended or adjusted under 35 U.S.C. 154(b) by 294 days.

(21) Appl. No.: 13/080,627

(22) Filed: Apr. 5, 2011

(65) Prior Publication Data
US 2012/0041795 A1 Feb. 16, 2012

Related U.S. Application Data (60) Provisional application No. 61/372,576, filed on Aug. 11, 2010.

(51) Int. Cl.
G06Q 50/06 (2012.01)
(52) U.S. Cl.
USPC ........... 702/182; 705/7.11; 705/412; 700/291
(58) Field of Classification Search
USPC .................. 700/291; 702/182; 705/7.11, 412
See application file for complete search history.

(56) References Cited

U.S. PATENT DOCUMENTS

| 2,521,869 | A | * | 9/1950 | Petzinger | 324/106 |
| 4,075,699 | A | * | 2/1978 | Schneider et al. | 700/291 |
| 2002/0019802 | A1 | * | 2/2002 | Malme et al. | 705/37 |
| 2004/0158360 | A1 | * | 8/2004 | Garland, II et al. | 700/286 |
| 2007/0216362 | A1 | * | 9/2007 | Kwit | 320/132 |
| 2008/0046387 | A1 | * | 2/2008 | Gopal et al. | 705/412 |

OTHER PUBLICATIONS

EPO User Guide (Energy Profiler Online User Guide, Power Management, Feb. 15, 2005; available at http://web.archive.org/liveweb/http://www.powerlogic.com/literature/7000024500.pdf).*

* cited by examiner

Primary Examiner — Andrew Schechter
Assistant Examiner — John Kuan
(74) Attorney, Agent, or Firm — William C. Milks, III (57) ABSTRACT A system, method, and computer program that provide demand weighted average power information. The information may be communicated to management in both graphical and report form. The information provides management with an immediate understanding of energy consumption in a time frame where the energy usage can be associated with underlying causes. The result is that the need to devote considerable time and expertise to obtain and understand important energy consumption data are eliminated.

18 Claims, 5 Drawing Sheets

DEMAND WEIGHTED AVERAGE POWER

CROSS-REFERENCE TO RELATED PATENT APPLICATION

This application relates to U.S. Provisional Patent Application No. 61/372,576 filed on Aug. 11, 2010, entitled NEW METRIC FOR SMART GRID-DWAP, which is hereby incorporated herein in its entirety by this reference.

FIELD OF THE INVENTION

This invention relates to the field of monitoring energy usage, for example, energy consumption by commercial consumers, and related costs. By way of example, but not by way of limitation, one example of the present invention provides computer assisted monitoring of energy consumption by entities whose costs for energy consumption are based on both energy usage and demand to provide a demand weighted average power metric that may be employed in "smart grid" analytics and/or automated energy cost control applications.

BACKGROUND OF THE INVENTION

Energy consumption is one of the key costs in various industries, for example, in the cost of operation of a manufacturing facility. Detailed energy consumption data with time stamps may be collected by information systems, but the information is not typically readily available or presented in a manner to be quickly assimilated by management of the facility.

Of all the utility bills that a commercial entity receives each month, none, perhaps, is more confusing than the electric bill. In theory, there should be no simpler parameter to measure than consumption of electricity: all the electric utility company must do is measure the consumption, multiply the measurement by an agreed-upon scheduled rate, and produce a final amount that is clear and simple to understand.

Instead, however, the known approach for producing electric utility bills is so convoluted that it often requires a separate ledger just to understand what a consumer is being asked to pay for. Currently, the electric utility company has two distinct measures according to which each commercial customer is charged: energy (measured in kWh) and demand (measured in kW). Simply put, if one imagines electricity consumption in terms of driving a motor vehicle, the energy usage (kWh) is analogous to the gasoline one consumes to travel from one point to another, while the demand (kW) is the rate at which the gasoline is consumed; drive fast, and one consumes more gasoline per mile than one does if he or she simply cruises at moderate speed down the highway. The same logic applies to electric utilities: use a large amount of power in a short amount of time, and one will place a large demand on the grid. Accordingly, to charge for energy consumption by a commercial consumer, then, the electric utility company monitors both energy usage and demand.

If that appears complicated, it is. With two variables to consider, most commercial consumers, even the ones which depend heavily on electricity, are typically not able to feed their energy consumption data into their operational models. And, with no single, streamlined parameter to work with, many enterprises rely on operational systems that help them optimize every facet of their business except electricity consumption, the cost of which is calculated as a separate, flat, monthly fee. If commercial consumers could generate a periodic (e.g., hourly) metric that they could feed into their operational models, they could optimize energy consumption as well; for that, they need a "smart grid."

In this regard, the term "smart grid" has been overused, with a myriad of companies each touting their own contributions to smart grid technology. For a grid to be truly smart, however, one must first be able to measure and understand electric energy consumption habits accurately, and to do that one must alter the most basic building block, which is metering. Instead of the electric utility company visiting the premises of each commercial consumer monthly to obtain a measurement of energy consumption, the newly introduced smart meter technology measures electricity consumption periodically, for example, at every hour or n-minute interval. The smart meter may also be linked directly to the electric utility company mainframe, and eliminate the need for inefficient monthly visits by electric utility company personnel to read a meter. More importantly, instead of two parameters, the smart meter may produce one, providing commercial consumers with analytics that would fit neatly into their existing operational models and help commercial entities turn electricity consumption from a constant into a variable and fundamentally change the way commercial consumers consume energy.

By revolutionizing metering, one would open the market to other, stand-alone devices and applications that commercial consumers could apply to meet their own needs, and force the rest of the grid to truly smarten up. By launching smart metering technology, electric utility companies may finally charge customers based on real-time pricing, at which point the devices utilized to run businesses could become truly smart and measure when they could take advantage of optimal electricity rates, directing energy consumption accordingly. Imagine, for example, having a computer assisted system that is connected to the electric utility company mainframe; as the price of electricity fluctuates throughout the day, the computer could search for the best cost periods, turning electrical systems and devices that consume electricity on and off accordingly, thereby optimizing production and minimizing cost. All that, however, is only possible if one can arrive at one agreed-upon metric that could be universally applied.

Conventional approaches to monitoring electric energy consumption generally consist of monthly electric utility bills with no graphical presentation of the data. The conventional approach regarding electric energy consumption, compiled on a monthly basis, does not provide daily or hourly detail, and the reasons for any cost problems can no longer be readily recalled. The prior art does not provide a comprehensive and user-friendly view of electric energy consumption on a periodic basis.

Accordingly, there is a need for a system and method that can present electric energy consumption data on a periodic basis, that does not require a significant commitment of time or expertise to assimilate. The need exists to present a large volume of data which can be readily assimilated by mangers employing a new metric that lends to graphical presentation for monitoring electric energy consumption and related costs.

SUMMARY OF THE INVENTION

The various examples of the embodiments of the present invention address the above-described challenges, with important improvements over the prior art in terms of speed, flexibility, and presentation of electric energy consumption data. In accordance with example embodiments of the present invention, electric energy consumption reporting is made accessible to management, for example, managers in a variety of commercial businesses.

Accordingly, a system, method, and computer program in accordance with one example embodiment of the present invention provide a metric referred to as demand weighted average power, or DWAP, that is produced periodically, for example, hourly, employing smart meter measurements and may additionally be presented in graphical form. The graphical presentation and additional reports respecting demand weighted average power may be employed to identify the timing and extent of electric energy consumption costs. The graphical presentation of the information provides management with an immediate understanding of electric energy consumption in a time frame where costs can be associated to underlying electric energy consumption.

One example embodiment of the present invention is preferably implemented by a fully automated software application providing computation of demand weighted average power on a periodic basis. Preferably, the frequency of the computations is user defined. After computation, for example, hourly, the entire process from development of graphical presentations and/or reports and email distribution may be fully automated. Each graphical presentation or report set can be sent according to separate email distribution lists.

The foregoing and other objects, features, and advantages of the present invention will become more readily apparent from the following detailed description of various example embodiments of the present invention, which proceeds with reference to the accompanying drawing.

BRIEF DESCRIPTION OF THE DRAWING

The various example embodiments of the present invention will be described in conjunction with the accompanying figures of the drawing to facilitate an understanding of the present invention. In the figures, like reference numerals refer to like elements. In the drawing.

DETAILED DESCRIPTION OF EXAMPLE EMBODIMENTS

Various example embodiments of the present invention provide a system and method for generating demand weighted average power data and periodic graphs and/or reports. For example, these are valuable in helping managers of commercial consumers identify the timing and extent of electric energy consumption.

One aspect of the present invention provides periodic computation of demand weighted average power. Another aspect provides a graphical presentation of demand weighted average power and report options. Another aspect of the present invention provides a number of key program modules that comprise a set of computer instructions stored on or in a computer-readable medium and capable of being executed by a processor to implement the desired periodic demand weighted average power computations and automate the creation of graphs and optional reports and distribution to recipients, for example, via email.

The present invention is particularly applicable to a computer implemented software based electric energy consumption monitoring and management system to provide a demand weighted average power metric, and it is in this context that the various example embodiments of the present invention will be described. It will be appreciated, however, that the system and method for providing monitoring and management based on the demand weighted average power metric in accordance with the present invention have greater utility, since they may be implemented in hardware or may incorporate other modules or functionality not described herein.

Figure 1:
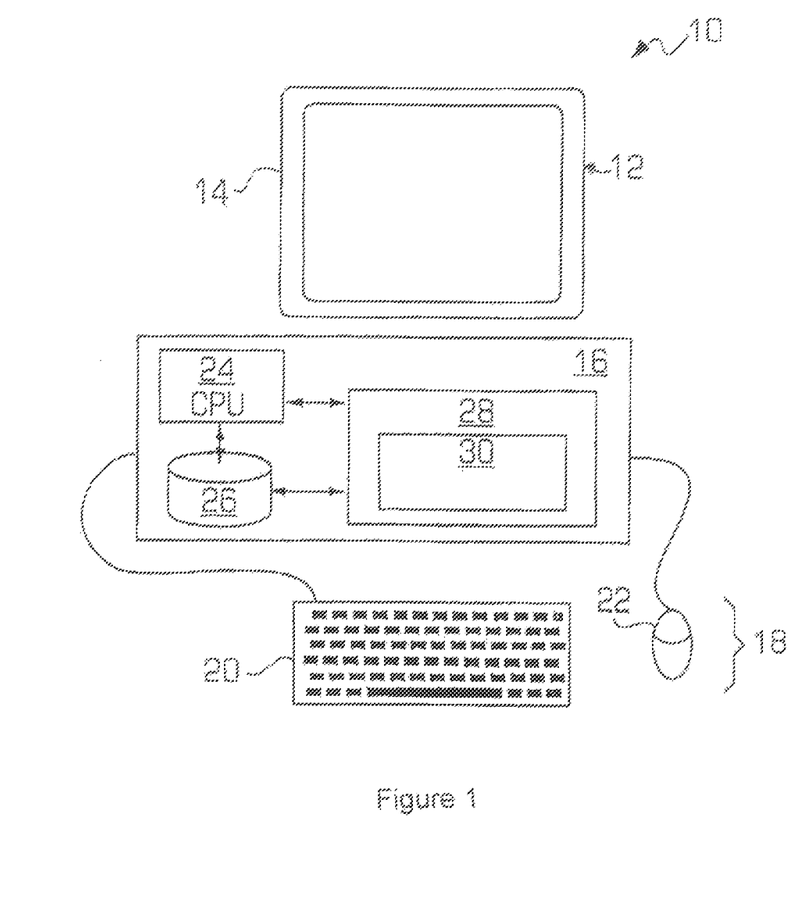
FIG. 1 is a schematic drawing of a hardware platform for implementation of the system in accordance with one example embodiment of the present invention.

Referring now to the drawing, FIG. 1 is a block diagram illustrating an example of a system 10 for computing demand weighted average power in accordance with one example embodiment of the present invention implemented on a personal computer 12. In particular, the personal computer 12 may include a display unit 14, which may be a cathode ray tube (CRT), a liquid crystal display, or the like; a processing unit 16; and one or more input/output devices 18 that permit a user to interact with the software application being executed by the personal computer. In the illustrated example, the input/output devices 18 may include a keyboard 20 and a mouse 22, but may also include other peripheral devices, such as printers, scanners, and the like. The processing unit 16 may further include a central processing unit (CPU) 24 (e.g., a Pentium 4 3.4 MHz and 2 GB of RAM), a persistent storage device 26, such as a hard disk, a tape drive, an optical disk system, a removable disk system, or the like, and a memory 28. The CPU 24 may control the persistent storage device 26 and memory 28. Typically, a software application may be permanently stored in the persistent storage device 26 and then may be loaded into the memory 28 when the software application is to be executed by the CPU 24. In the example shown, the memory 28 may contain a demand weighted average power metric computation tool 30 for generating data to enable electric energy consumption monitoring and management. The demand weighted average power metric computation tool 30 may be implemented as one or more software modules that are executed by the CPU 24.

Figure 2:
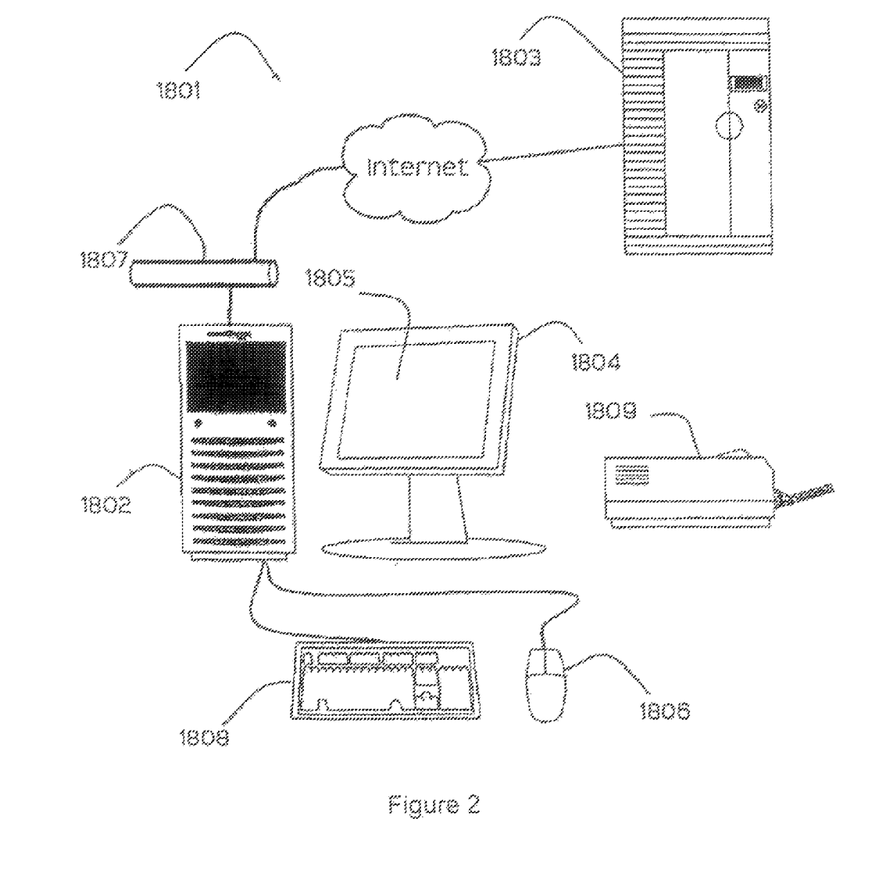
FIG. 2 is schematic drawing of an alternative hardware platform for implementation of the system in accordance with another example embodiment of the present invention.

In accordance with various contemplated example embodiments of the present invention, the system 10 may also be implemented using hardware and may be implemented on different types of computer systems, such as client/server systems, Web servers, mainframe computers, workstations, and the like. Thus, in accordance with another example embodiment of the present invention, the system 10 may be implemented via a hosted Web server. A system using a hosted Web server, generally indicated by the numeral 1801, is shown in FIG. 2. The system 1801 preferably comprises a Web-based application accessed by a personal computer 1802, as shown in FIG. 2. For example, the personal computer 1802 may be any personal computer having at least two gigabytes of random access memory (RAM), using a Web browser, preferably MICROSOFT Internet Explorer 6.0 browser or greater available from Microsoft Corporation located in Redmond, Wash.

In this example, the system 1801 is a 128-bit SSL encrypted secure application running on a MICROSOFT Windows Server 2003 operating system or Windows Server 2000 operating system or later operating system available from Microsoft Corporation. The personal computer 1802 also comprises a hard disk drive preferably having at least 40 gigabytes of free storage space available. The personal computer 1802 is coupled to a network 1807. For example, the network 1807 may be implemented using an Internet connection. In one implementation of the system 1801, the personal computer 1802 can be ported to the Internet or Web, and hosted by a server 1803. The network 1807 may be implemented using a broadband data connection, such as, for example, a DSL or greater connection, and is preferably a T1 or faster connection. The graphical user interface of the system 1801 is preferably displayed on a monitor 1804 connected to the personal computer 1802. The monitor 1804 comprises a screen 1805 for displaying the graphical user interface provided by the system 1801. The monitor 1804 may be a 15" color monitor and is preferably a 1024×768, 24-bit (16 million colors) VGA monitor or better. The personal computer 1802 further comprises a 256 or more color graphics video card installed in the personal computer. As shown in FIG. 2, a mouse 1806 is provided for mouse-driven navigation between screens or windows comprising the graphical user interface of the system 1801. The personal computer 1802 is also preferably connected to a keyboard 1808. The mouse 1806 and keyboard 1808 enable a user utilizing the system 1801 to perform periodic demand weighted average power determinations. Preferably, the user can print the results using a printer 1809. The system 1801 is implemented as a Web-based application, and data may be shared with additional software (e.g., a word processor, spreadsheet, or any other business application). Persons skilled in the art will appreciate that the systems and techniques described herein are applicable to a wide array of business and personal applications.

Figure 3:
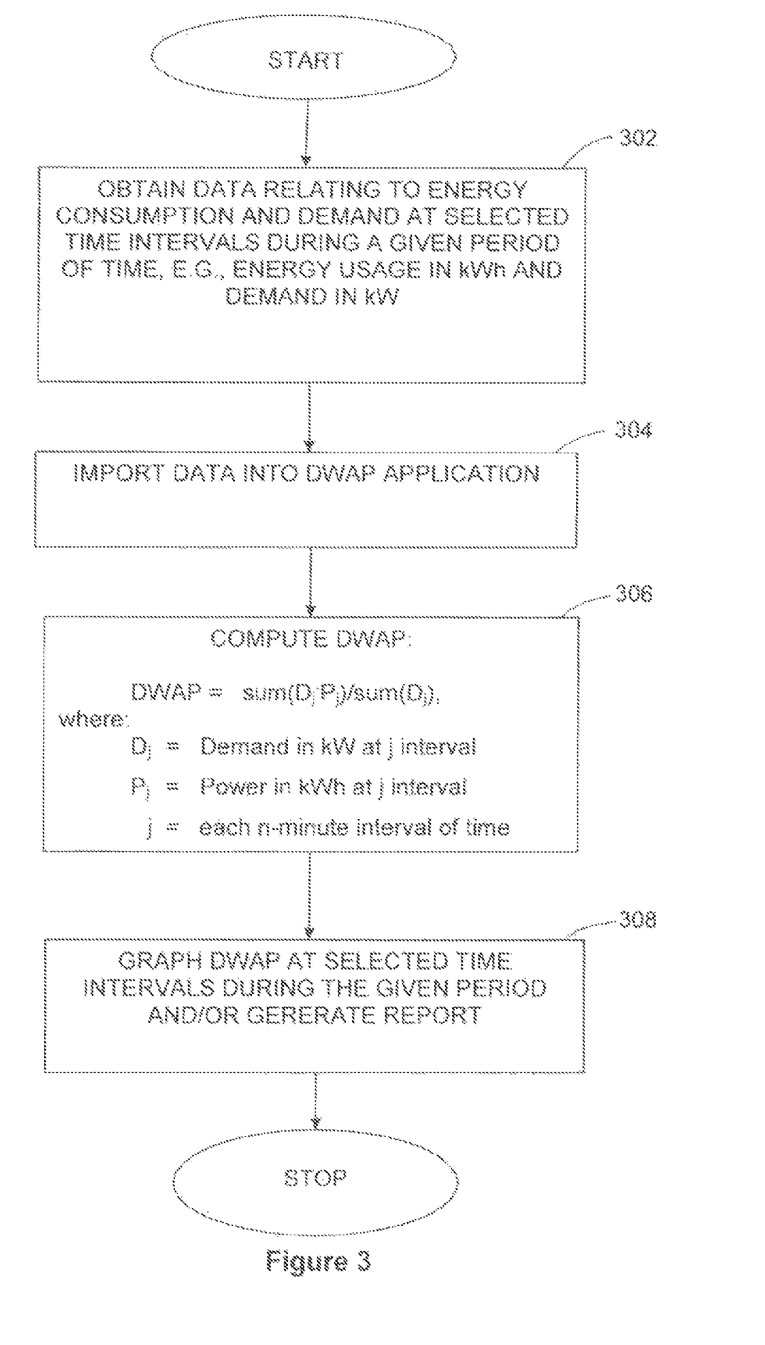
FIG. 3 illustrates the basic process flow of the method for determining the demand weighted average power metric and creating a graphical presentation and report for distribution in accordance with one example embodiment of the present invention.

In accordance with one example embodiment of the method of the present invention, a metric referred to as demand weighted average power, or DWAP, is produced. Specifically, $$DWAP = \text{sum}(D_j \cdot P_j)/\text{sum}(D_j),$$

where:
$D_j$=Demand in kW j interval
$P_j$=Power in kWh at j interval
j=each individual n-minute interval of measurement FIG. 3 shows the processing flow for various application program modules in accordance with one computer implemented example embodiment of the present invention. Periodic monitoring of demand weighted average power may be performed daily, as will be described in more detail below and may span the period of a day, for example. Data are periodically obtained from metering information system (e.g., a smart meter system) as indicated by a step 302 shown in FIG. 3. For example, data may be obtained at predetermined time intervals during the period of a day, that is, over a 24-hour period. This can be hourly or at n-minute intervals or even more granular sub units of time (e.g., seconds). For example, the data are demand in kW and energy consumption in kWh in the example of electric energy consumption. The data may be in spreadsheet or comma separated value format. This data is imported into the demand weighted average power application, as indicated by a step 304 shown in FIG. 3, where the data is utilized for subsequent processing. The demand weighted average power metric is then computed, as indicated by a step 306 shown in FIG. 3. Following computation of the demand weighted average power metric, a graph of demand weighted average power may be generated and/or a corresponding report may be generated, for example, as documents in Adobe Acrobat or other format, as indicated by a step 308 shown in FIG. 3. In a contemplated modification of the example method shown in FIG. 3, email addresses may be obtained for distribution of the demand weighted average power determinations. Finally, emails with graphical presentation and/or report attachments may then be created and sent.

Figure 4:
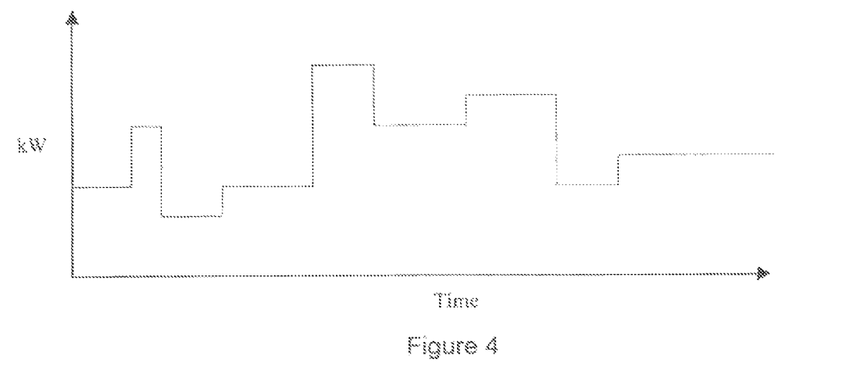
FIG. 4 shows an example of a graph of periodically measured electric power demand in kilowatts.
Figure 5:
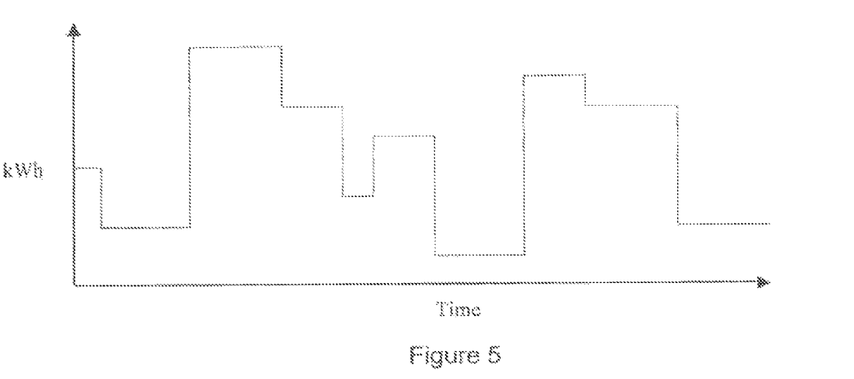
FIG. 5 shows an example of a graph of periodically measured electric energy consumption in kilowatt-hours.

Considered in more detail, costs related to electric energy consumption have required observing and analyzing the two graphs shown in FIGS. 4 and 5. FIG. 4 is a graph of electrical demand measured in kilowatts (kW) during a period of time measured at given intervals, for example, hourly intervals. FIG. 5 is a graph of electrical energy usage, for example, electrical energy measured in kilowatt-hours (kWh), during the same period of time at the same given intervals as the period and the time intervals shown in FIG. 4.

Figure 6:
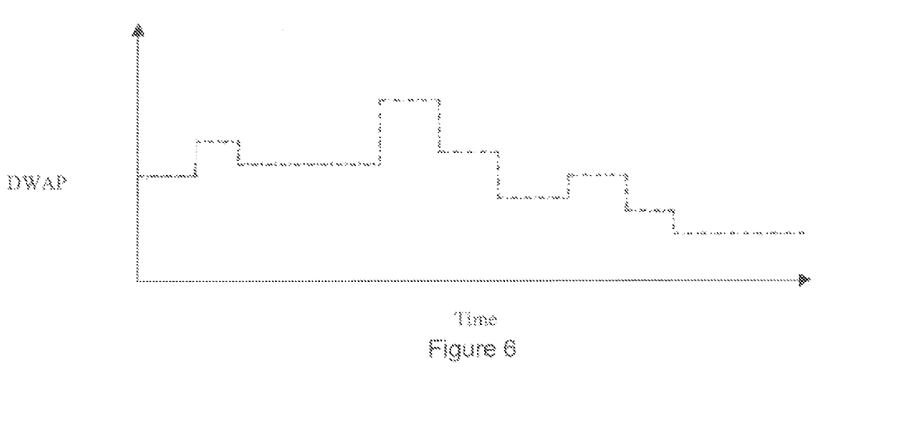
FIG. 6 shows an example of a graph of periodically computed demand weighted average power metric in accordance with the present invention.

FIG. 6 is a graph of demand weighted average power (DWAP) in accordance with the example method of the present invention during the same period of time at the same given intervals as the period and the time intervals shown in FIGS. 4 and 5. Employing the metric of demand weighted average power, commercial consumers are able to radically improve their performance: with a metering system now measuring consumption on an hourly basis and able to identify the inputs and outputs of each part of a production plant, for example, commercial consumers are able to create detailed analyses of energy consumption, and optimize energy usage accordingly. The information may additionally comprise the demand in kW and energy consumption in kWh, at the selected time intervals during the given period, as well as the demand weighted average power, and may further comprise average and median demand average weighted power if desired.

The graph of demand weighted average power shown in FIG. 6 demonstrates the advantages of the example method of the present invention. FIG. 6 illustrates an important view of demand weighted average power for management to immediately assess potential areas of concern that can then be examined in more detail and/or utilized to manage energy consumption using the illustrated graph. Consider, for example, a hospital. An X-ray department, for example, may consume as much electrical energy as the entire facility in which the X-ray department is located. Each department in the facility may be charged differently: one (the X-ray department) draws power in short, intense bursts, and the other departments do so steadily over the course of the day. Employing the demand weighted average power graph shown in FIG. 6 or a corresponding report, for example, sent by email would enable a hospital administrator to see a single number and enable him or her to allocate resources accordingly and act to optimize electric energy consumption globally. The demand weighted average power metric provides a powerful monitoring capability, far superior to the prior art. The overall graph provides an important advance versus the prior art, providing a graphical view of electric energy usage that can immediately convey the timing and extent of electricity consumption and related cost.

Or, as another example, consider a college campus: the building that houses the chiller, for example, may draw the same amount of power as another building, but the charge for each building is different, given the intensity (demand). To surface the hidden cost, and control the grid to maximize efficiency, the graph of the demand weighted average power metric shown in FIG. 6 can be employed.

Finally, it should be noted that the demand weighted average power metric in accordance with the example embodiments of the present invention can also play an important role in promoting truly green energy consumption. With better metering comes a deeper understanding and a more accurate analysis of consumers' needs, which leads not only to financial benefits for consumers and providers alike, but also may result in a significant reduction in energy waste.

While the foregoing description has been with reference to particular example embodiments and contemplated alternative embodiments of the present invention, it will be appreciated by those skilled in the art that changes may be made without departing from the principles and spirit of the invention. In accordance with the example embodiments, an electric energy consumption application has been described. However, the principle of the present invention applies more generally. The invention would also have application in other energy usage applications, for example, natural gas consumption. Accordingly, the scope of the present invention can only be ascertained with reference to the appended claims.

What is claimed is:

1. A method for determining demand weighted average power on a periodic basis, comprising the steps of:
measuring demand and energy consumption at selected time intervals during a period of time using an external metering system;
storing measured demand and consumption data on or in a non-transitory processor-readable storage medium;
computing demand weighted average power (DWAP) using a processor as $$DWAP=\operatorname{sum}(D_j \cdot P_j)/\operatorname{sum}(D_j),$$

where:
$D_j$=Demand at j interval
$P_j$=Power at j interval
j=each individual n-minute interval of measurement;
and
producing an output of the computed demand weighted average power with respect to time.

2. The method according to claim 1 wherein the demand weighted average power is computed on an hourly basis.

3. The method according to claim 1 wherein demand is measured in kilowatts and power is measured in kilowatt-hours.

4. The method according to claim 1 wherein producing an output comprises creating a graph of the computed demand weighted average power with respect to time.

5. The method according to claim 4 wherein creating a graph comprises producing a graph as a document in .pdf or other format, and further comprising the steps of:
generating emails from a distribution list; and
attaching the document to the emails;
thereby automating the entire process from creation of the graph to generation of the document and email distribution.

6. The method according to claim 1 wherein producing an output comprises compiling a report of the computed demand weighted average power with respect to time.

7. The method according to claim 6 wherein compiling a report comprises producing a report as a document in .pdf or other format, and further comprising the steps of:
generating emails from a distribution list; and
attaching the document to the emails;
thereby automating the entire process from compilation of the report to generation of the document and email distribution.

8. A method for quickly transforming demand and energy consumption data into a readily assimilated output presentation, comprising the steps of:
measuring demand and energy consumption at selected time intervals during a period of time using an external metering system;
storing measured demand and consumption data on or in a non-transitory processor-readable storage medium;
selecting an n-minute time interval;
computing demand weighted average power (DWAP) using a processor as $$DWAP=\operatorname{sum}(D_j \cdot P_j)/\operatorname{sum}(D_j),$$

where:
$D_j$=Demand at j interval
$P_j$=Power at j interval
j=each individual n-minute interval of measurement;
and
producing a graph of the computed demand weighted average power with respect to time or a report of the computed demand weighted average power with respect to time;
generating emails from a distribution list; and
attaching the graph or report to the emails;
whereby the time and extent of energy consumption is readily understood to allow improved and timely decision making to improve processes, and the entire process from producing of a graph or report and email distribution is automated.

9. The method according to claim 8 wherein the demand weighted average power is computed on an hourly basis.

10. The method according to claim 8 wherein demand is measured in kilowatts and power is measured in kilowatt-hours.

11. The method according to claim 8 wherein the graph or report is produced as a document in .pdf or other format.

12. A system comprising computer instructions stored in or on a non-transitory computer-readable medium to be executed by a processor for determining demand weighted average power on a periodic basis from data comprising measured demand and energy consumption at selected time intervals during a period of time, the instructions comprising:
instructions to import the data from an external information system;
instructions to compute demand weighted average power (DWAP) as $$DWAP=\operatorname{sum}(D_j \cdot P_j)/\operatorname{sum}(D_j),$$

where:
$D_j$=Demand at j interval
$P_j$=Power at j interval
j=each individual n-minute interval of measurement;
and
instructions to produce an output of the computed demand weighted average power with respect to time.

13. The system according to claim 12 wherein the instructions comprise instructions to compute demand weighted average power on an hourly basis.

14. The method according to claim 12 wherein demand is measured in kilowatts and power is measured in kilowatt-hours.

15. The system according to claim 12 wherein the instructions to produce an output comprise instructions to create a graph.

16. The system according to claim 15 wherein the instructions to create a graph comprise instructions to create a graph as a document in .pdf or other format, and further comprising:

instructions to generate emails from a distribution list; and
instructions to attach the document to the emails;
whereby the entire process from creation of the graph to generation of the document and email distribution is automated.

17. The system according to claim 12 wherein the instructions to produce an output comprise instructions to compile a report of the computed demand weighted average power with respect to time.

18. The system according to claim 17 wherein the instructions to compile a report comprise instructions to compile a report as a document in .pdf or other format, and further comprising:
instructions to generate emails from a distribution list; and
instructions to attach the document to the emails;
whereby the entire process from compilation of the report to generation of the document and email distribution is automated.

\* \* \* \* \*